United States Patent [19]

Cylke

[11] 3,811,745

[45] May 21, 1974

[54] CASSETTE CARRIER

[76] Inventor: Edward J. Cylke, Rt. 1, Box 283, Ellijay, Ga. 30540

[22] Filed: Sept. 29, 1972

[21] Appl. No.: 295,990

[52] U.S. Cl. .............. 312/13, 206/DIG. 36, 221/87, 312/245, 312/319

[51] Int. Cl. .......................... A47f 1/04, F16b 12/00

[58] Field of Search ........................... 312/9–14, 15, 312/20, 108, 111, 319, 330, 245–248; 221/87; 206/DIG. 36, 1 R

[56] References Cited

UNITED STATES PATENTS

| | | | |
|---|---|---|---|
| 2,981,581 | 4/1961 | Karlsson | 312/15 |
| 3,666,337 | 5/1972 | Sztorc | 312/10 |
| 3,710,900 | 1/1973 | Fink | 312/10 |
| 3,603,478 | 8/1971 | Connan | 221/87 |

*Primary Examiner*—Casmir A. Nunberg
*Attorney, Agent, or Firm*—Clarence A. O'Brien; Harvey B. Jacobson

[57] ABSTRACT

A carrier rack cabinet has an opening restrictively receiving tape cassette bodies at a predetermined angular orientation relative to a back wall of the cabinet housing. Spring elements yieldably limit insertion of the cassette bodies to positions from which they may be displaced in two stages to reference positions and permanent storage positions abutting the back wall of the housing.

10 Claims, 4 Drawing Figures

CASSETTE CARRIER

This invention relates to a carrier cabinet or rack for commercial tape cassettes or similar articles.

With the increasing sales and use of tape cassettes by the public, storage of cassette bodies and easy access thereto has become a problem. Because of the relatively small rectangular shape of commercial tape cassette bodies, ordinary storage facilities presently available are unsuitable. Accordingly, it is an important object of the present invention to provide special storage facilities for tape cassette bodies which will also facilitate retrieval and provide for expansion of storage capacity in storage units that occupy a minimum amount of space and are of economical construction.

In accordance with the present invention, a storage cabinet unit is formed by a housing assembled from planar walls to enclose a storage space having a front opening through which a commercial type of tape cassette body can be inserted only when orientated parallel to the side walls of the housing at an angle to the back wall. Guide slot formations on the inside of a front wall, guide insertion of the cassette body to a limit position from which it may be angularly displaced toward the back wall. Spring elements yieldably limit insertion and hold the inserted cassette body in either a reference position or a permanent storage position to which the inserted cassette body is displaced in two stages from the inserted limit position. Track slot formations on the top wall of the housing receive the cassette body when displaced inwardly from the reference position to guide it to the permanent storage position abutting the back wall. A plurality of cassette bodies may thus be stored parallel to each other in either of two positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
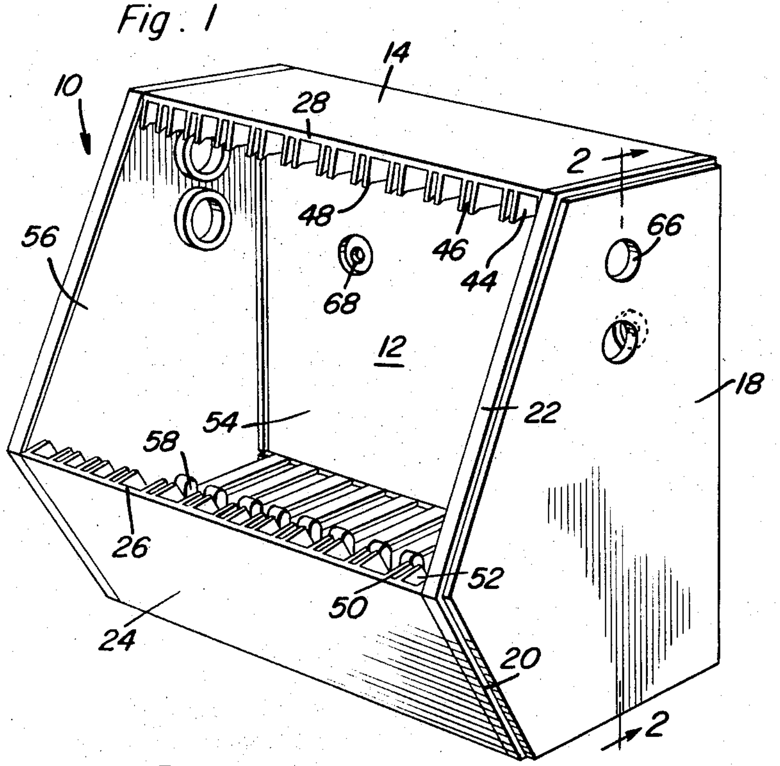
FIG. 1 is a perspective view of a storage cabinet constructed in accordance with the present invention.

Referring now to the drawings in detail, FIG. 1 illustrates a typical storage cabinet unit constructed in accordance with the present invention and generally denoted by reference numeral 10. The cabinet unit consists of a housing formed by planar walls preferably made of plastic sheet material although not necessarily limited thereto.

Figure 2:
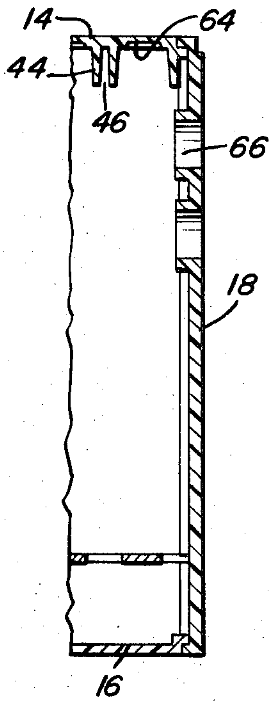
FIG. 2 is a partial front sectional view taken substantially through a plane indicated by section line 2—2 in FIG. 1.

In the illustrated embodiment, the housing walls consist of a rectangular back wall assembly connected at its upper and lower edge portions to a rectangular top wall 14 and a rectangular bottom wall 16 which is parallel to the top wall as shown, for example, in FIG. 2. Parallel spaced side walls 18 are interconnected with the assembled back, top and bottom walls. The side walls are formed with lower and upper front edge portions 20 and 22 disposed at an obtuse angle to each other. A front wall 24 is connected to the bottom wall 16 and extends upwardly therefrom between the lower edge portions of the side walls in diverging relation to the back wall of the housing as more clearly seen in FIG. 3. Thus, an upper, exposed edge 26 of the front wall, which is spaced below the front edge 28 of the top wall, together with the front edge 28 and the upper edge portions 22 of the side walls, form an opening 56 through which a commercial type of tape cassette body 29 may be inserted into the housing as shown in FIG. 3.

Figures 3, 4:
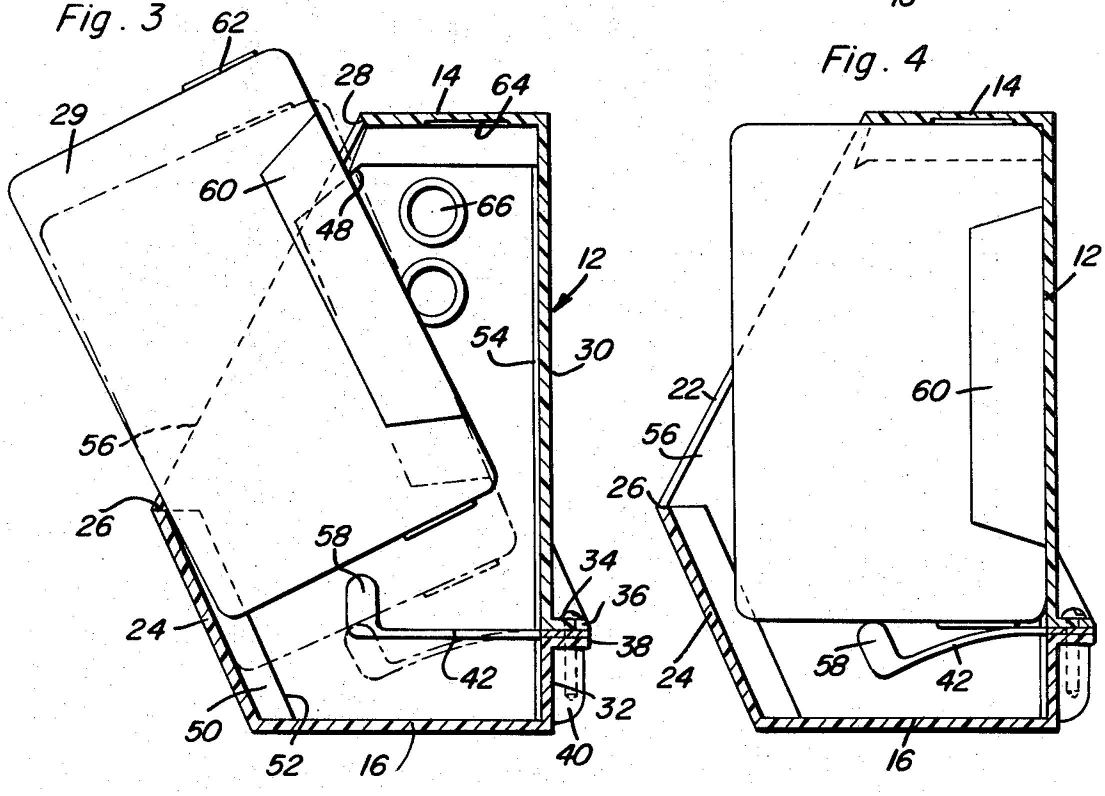
FIG. 3 is a side sectional view taken substantially through a plane indicated by section line 3—3 in FIG. 2, showing a tape cassette body being inserted.
FIG. 4 is a side sectional view like FIG. 3, showing the cassette body in its permanent storage position.

While different fabrication and assembly expedients may be utilized, the back wall 12 as shown in FIG. 3, is assembled from an upper portion 30 and a lower portion 32 that are secured to each other by fasteners 34 extending through a reinforced flange 36 on the upper portion 30 and a flange 38 on the lower wall portion 32 into rearwardly extending enlargements 40 on the lower wall portion. A plurality of leaf spring elements 42 are anchored to the back wall between the flanges 36 and 38 for purposes to be described hereafter. The top wall 14 may be a right angle extension of the upper back wall portion 30 while the front and bottom walls 24 and 16 may be integral with the lower back wall portion 32 as shown. The side walls 16, on the other hand, may be snapped onto the abutting edges of top, back, bottom and front wall assemblies as described, of different horizontal length, to form cabinet housings of different storage capacity.

As more clearly seen in FIGS. 1 and 2, the top wall 14 is provided with a plurality of downwardly depending pairs of track formations 44 between which a plurality of guide slots 46 are defined aligned along equally spaced planes parallel to the side walls 18. The lower, forward corner portions of the track formations 44 are provided with hooks 48 for purposes to be explained hereafter. Each of the slots 46 is aligned with a corresponding slot 50 formed between pairs of guide formations 52 projecting inwardly from the front wall 24. While the slots 46 extend perpendicular to the rear interior surface 54 on the back wall 12, the guide slots 50 are disposed at an acute angle thereto corresponding to the aforementioned divergence of the front wall 24, in order to receive and guide insertion of the cassette body 29 as shown in FIG. 3.

The opening 56 defined by the exposed edges of the top, side and front walls as aforementioned, is dimensioned to restrict insertion to the cassette body 29 oriented so that it is aligned with a plane extending through a corresponding pair of slots 46 and 50 and at a predetermined insertion angle to the rear surface on the back wall. The cassette body may then be inserted to a limit position engaging the stop formation 58 on one of the leaf spring elements 42 disposed below the upper edge 26 of the front wall and above the bottom wall. The spring element is thus deflected by the cassette body when it assumes a fully inserted position from which the body may be angularly displaced to a reference position as shown by dotted line in FIG. 3. The cassette body is yieldably held by the deflected spring element in the reference position with the hooks 48 engaging the usual side enlargements 60 on the cassette body, at the upper ends thereof as shown by dotted line in FIG. 3. The cassette body must therefore be inserted with the enlargements 60 along the edge that enters the opening 56 closest to the back wall.

The reference position of the cassette body provides better exposure of identifying labels and easier removal. From this position, the body 29 may be downwardly and angularly displaced against the bias of spring element 42 in order to bring the upper edge of the cassette body into the track slot 46. The body 29 may then be displaced rearwardly, guided by the slot 46, until it fully abuts the rear surface 54 in a permanent storage position as shown in FIG. 4. In the storage position, the usual ear formation 62 on the cassette body snaps into one of a plurality of ear slots 64 formed on the inside of the top wall 14 and is held in this position under the upward bias of spring 42.

The cassette body is removed from its permanent storage position by a reversal of the two stage insertion procedure hereinbefore described. Thus, the body 29 is initially depressed against the bias of the spring element 42 at the portion of the upper edge exposed from the housing, thereby releasing the ear 62 from the ear slot 64 and pivoting the body into the guide slot 50. The cassette body will then be guided upwardly at an angle, under the bias of the spring element, until the side formations 60 are engaged by the hooks 48 in the reference position. For complete withdrawal, the body is then pivoted further outwardly to the solid line position shown in FIG. 3.

The storage cabinet 10 may be placed on shelves or other horizontal supporting surfaces or mounted on vertical surfaces through mounting bracket holes 66 and 68 formed in the side walls and back wall as shown in FIG. 1. The cassettes may be conveniently inserted and yieldably locked in either of two positions providing for easy storage and selection of desired tapes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A storage rack a substantially rectangular body, comprising a cabinet housing having a back wall, a top wall, a bottom wall, a pair of side walls interconnected with the back, top and bottom walls and a front wall extending upwardly from the bottom wall between the side walls in diverging relation to the back wall, said front wall having an upper exposed edge spaced from the top wall to define a front opening through which a cassette body is adapted to be inserted into the housing in an angular insertion position relative to the back wall, guide means mounted on the front wall internally of the housing for guiding insertion of the cassette body into the housing in said angular insertion position, spring mean mounted internally of the housing for yieldably limiting said insertion of the cassette body into the housing and track means mounted on the top wall internally of the housing for receiving the inserted body in response to angular displacement thereof under the bias of the spring means from said angular insertion position.

2. The combination of claim 1, including hook means projecting from the track means for engagement with the inserted body to hold the same in a reference position.

3. The combination of claim 2 wherein the body is displaceable from the reference position against the bias of the spring means into the track means for guided movement to a permanent storage position abutting the back wall.

4. The combination of claim 3 wherein the guide means and the track means include a plurality of slot formations on the front and top walls respectively, aligned in parallel spaced planes between the side walls of the housing.

5. The combination of claim 4 wherein said spring means includes a plurality of elastically deflectable leaf elements projecting from the back wall in spaced relation above the bottom wall and below the exposed edge on the front wall.

6. The combination of claim 1 wherein the guide means and the track means include a plurality of slot formations on the front and top walls respectively, aligned in parallel spaced planes between the side walls of the housing.

7. The combination of claim 6 wherein said spring mean includes a plurality of elastically deflectable leaf elements projecting from the back wall in spaced relation above the bottom wall and below the exposed edge on the front wall.

8. The combination of claim 1 wherein said spring means includes a plurality of elastically deflectable leaf elements projecting from the back wall in spaced relation above the bottom wall and below the exposed edge on the front wall.

9. A storage rack comprising a housing having a front opening through which a body is inserted, means for restrictively guiding insertion of the body substantially in a predeterimined angular orientation, means for yieldably limiting said insertion of the body to a limit position from which the body is angularly displaceble, and means engageable by the body in response to angular displacement from said limit position for holding the body in at least two storage postions.

10. The combination of claim 9 wherein said housing includes a back wall against which the body abuts in one of the two storage positions, with the body for resisting insertion thereof and biasing the body into the body holding means.

* * * * *